United States Patent

Schuder

[11] Patent Number: 5,196,680
[45] Date of Patent: Mar. 23, 1993

[54] CARDAN-TYPE SUPPORT FOR MAGNETIC HEADS

[75] Inventor: Bernd Schuder, Schwaigern, Fed. Rep. of Germany

[73] Assignee: Amphenol-Tuchel Electronics GmbH, Fed. Rep. of Germany

[21] Appl. No.: 503,898

[22] Filed: Apr. 4, 1990

[30] Foreign Application Priority Data

Apr. 4, 1989 [DE] Fed. Rep. of Germany ....... 3910880

[51] Int. Cl.$^5$ .................... G06K 7/08; G11B 21/16
[52] U.S. Cl. .................... 235/449; 360/104; 360/109; 464/171; 411/537
[58] Field of Search ............ 360/104, 106, 109, 2, 360/77.1, 78.01, 129; 235/439, 449, 484, 493; 464/47, 129, 130, 169, 171, 185, 138; 411/537, 380, 381; 403/131

[56] References Cited

U.S. PATENT DOCUMENTS

| | | | |
|---|---|---|---|
| 2,985,723 | 5/1961 | Schober | 360/104 |
| 3,440,359 | 4/1969 | Page et al. | 360/106 |
| 3,628,386 | 12/1986 | Chabrolle | 360/2 |
| 4,358,103 | 11/1982 | Koike et al. | 235/449 |
| 4,449,160 | 5/1984 | Binder et al. | 360/109 X |
| 4,581,523 | 4/1986 | Okuno | 360/2 |
| 4,631,610 | 12/1986 | Kobayashi et al. | 360/104 |
| 4,684,794 | 8/1987 | Holland-Letz | 360/2 |
| 4,734,794 | 3/1988 | Mehnert et al. | 235/449 |
| 4,737,874 | 4/1988 | Sims, Jr. | 360/129 |

FOREIGN PATENT DOCUMENTS

| | | | |
|---|---|---|---|
| 0286842 | 10/1988 | European Pat. Off. | 235/449 |
| 3441848 | 10/1987 | Fed. Rep. of Germany | |
| 2420804 | 10/1979 | France | |

Primary Examiner—John W. Shepperd
Assistant Examiner—Edward H. Sikorski
Attorney, Agent, or Firm—Bacon & Thomas

[57] ABSTRACT

A magnetic head support for a card reader includes a cardanically mounted support arm. Cardanic movement is permitted by a spherical bearing on the arm, which is biased against a screw fixed to a stationary component to form a universal pivot. The arm is guided by guide members on the stationary component and includes, at one end, an adjustment frame in which the head is adjustably positioned relative to a specific track.

20 Claims, 6 Drawing Sheets

CARDAN-TYPE SUPPORT FOR MAGNETIC HEADS

DESCRIPTION

1. Technical Field

This invention relates generally to a support for magnetic heads, and, more particularly, to a cardan-type support for magnetic heads adapted to be mounted on a stationary component of a reading apparatus for cards (magnetic card reader) carrying an information storing magnetic stripe (magnetic card). Generally, the invention relates to a reading apparatus for such a magnetic card using a cardan-type support.

2. Background Art

Reading apparatus for magnetic cards have been known for a long time and generally use a support arm which carries at its one end, refered to as the magnetic head end, a magnetic head. Said support arm is mounted on a stationary component of the magnetic card reader using a cardan-type or a universal joint type arrangement, such that the support arm together with the magnetic head, which is biased towards the magnetic card, can adapt to and follow the surface of the magnetic tracks provided on the magnetic card. In said known cardan-type support a stamped sheer metal member is used having an opening at its magnetic head end which corresponds to the width of the magnetic head. In said opening the magnetic head is located.

As is well known, a magnetic card can haven more than just one magnetic track, with which a magnetic head has to be aligned.

In case it is required to use the support arm formed by the stamped sheet metal member for reading a different track, the entire support arm is correspondingly displaced at the stationary component of the card reader, at the time the card reader is assembled. For this purpose guide pins are located at the stationary component. Said guide pins are provided in the area of a guide end of the support arm which is located oppositely to the magnetic head end. Said guide pins may, for example, be mounted at the bottom of a magnetic card reader. Additional pins are provided in the vicinity of the magnetic head end. Further, a relatively complicated cone shaped spring is arranged about a screw, which serves as a support for the support arm.

Apart from the complicated and thus costly design of said known support means, there is the additional disadvantage that with a single support arm not all desirable locations of the magnetic head for reading different tracks on a magnetic card can be realized in an efficient manner. It should be noted that magnetic heads are available for reading one track, for reading two tracks and for reading three tracks. Accordingly, said magnetic heads are called a one track head, a two track head or a three track head.

Moreover, the support means of the prior art can not be readily arranged together with the magnetic head on the opposite side of the magnetic card reader. This is due to the sheet metal frame of the support arm, and is also due to the guide pins on the stationary component of the card reader. To arrange the support arm together with the magnetic head on the opposite side is required for so called hybrid-readers, which can read so called hybrid-cards, i.e. cards which carry at their upper surface chip contacts and ar the bottom surface magnetic tracks.

German patent 34 41 848 discloses an apparatus for pressing transducer heads against the tracks of a magnetic card. A plurality of support arms is provided and each of said support arms carries a transducer head. Each of said support arms does not allow for an adjustment of the respective transducer or magnetic head with regard to the different tracks on a magnetic card.

It is an object of the present invention to overcome one or more of the problems as set forth above. It is still another object of the invention to provide a cardan-type or universal joint type support means for a magnetic head, such that an adjustment of different magnetic heads for different tracks is readily possible. It is another object of the present invention to provide for such an adjustment of the magnetic head without requiring a change of the position of a support arm itself at the stationary component of a magnetic card reader. It is a still further object of the present invention to provide a support for magnetic heads such that a precise positioning of the magnetic head with respect to the magnetic tracks to be read is possible. According to another object of the invention the cardan-type support makes it possible to arrange said support means without any difficulties on the opposite side of the card, for instance if the card reader is adapted to read hybrid-cards.

DISCLOSURE OF THE INVENTION

In one aspect of the present invention a cardan-type support for magnetic heads includes a support arm as well as means for mounting (bearing), guiding and biasing said support arm at a stationary component of a magnetic card reader. The support arm is provided such that the magnetic head can be adjusted for different tracks of a magnetic card to be read in said magnetic card reader. This adjustment is possible without having to change the position of the support arm at the stationary component. The support arm comprises a first or magnetic head end and a second or guiding end. Magnetic head adjustment means allow the adjustment of a magnetic head in a desired position selected from different positions in which the magnetic head can be located. After a desired position has been reached, the magnetic head is fixedly mounted at the support arm.

In a second aspect of the present invention a cardan-type support for reading means is provided. Said reading means have to be mounted at a stationary component. The cardan-type support comprises a support arm which is designed such that the reading means can be adjusted to different locations in correspondence to the location of the information to be read.

Due to the cardan- or universal-joint type mounting of the support arm single track or multiple track magnetic heads can be fixedly mounted at the support arm in such a manner that the magnetic heads are properly aligned with respect to a single magnetic track and a plurality of magnetic tracks, respectively.

In accordance with a preferred design the cardan-type support arm cooperates with a standard cylinder screw which in turn cooperates with a semi-circular bearing surface on the support arm. Alternatively, the support arm is mounted to a stationary component of a card reader by a special screw having a spherical bearing surface which cooperates with a recess in the support arm.

Code means can be provided to simplify the adjustment of the magnetic head. Said code means can be code numbers located at the support arm, preferably in an area of the support arm were an adjustment frame is formed which is adapted to receive said magnetic heads. Preferably, the support arm is made of plastic material so as to save costs and space.

As was already mentioned, the cardan-type support is particularly useful in a hybrid-card reader, i.e. a card reader which reads magnetic cards as well as chip cards (i.e. hybrid-cards).

DETAILED DESCRIPTION OF THE PREFERRED EMBODIMENTS

Figure 1:
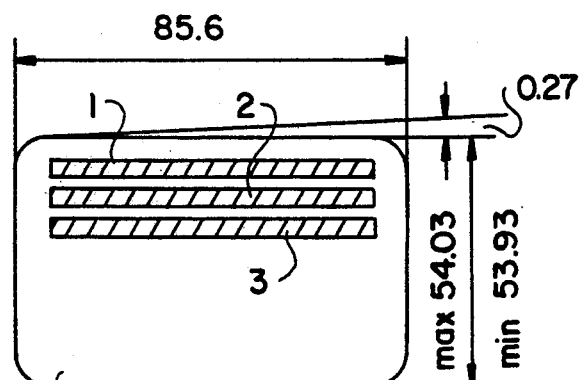
FIG. 1 is a schematic top plan view of a magnetic card.

Prior to a discussion of the magnetic card reader of the invention shown in FIG. 6 through 9 we will explain by refering to FIG. 1 to 5 the design of a magnetic card as well as the magnetic heads cooperating with such a card. A magnetic card 4 is shown in FIG. 1. The card 4 comprises a magnetic area which is generally continuous. This area can be divided into three magnetic tracks 1, 2 and 3. The standardized distances of said tracks 1, 2 and 3 are indicated in millimeters in FIG. 2. FIG. 1 gives the size of the card also in millimeters.

Figure 3:
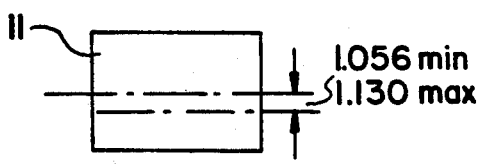
FIG. 3 is a schematic top plan view of a single track magnetic head.
Figure 4:
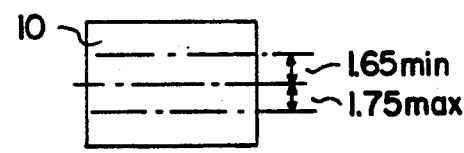
FIG. 4 is a schematic top plan view of a two track magnetic head.
Figure 5:
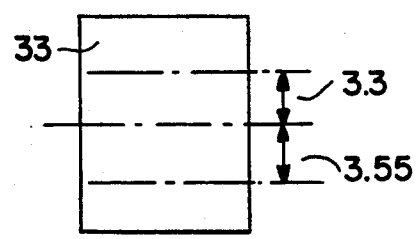
FIG. 5 is a schematic top plan view of a three track magnetic head.

Depending upon which tracks are to be read, or, into which tracks information has to be written, different magnetic heads are used in different types of card readers. FIG. 3 shows a so called single track magnetic head 11, FIG. 4 shows a two track magnetic head 10, and FIG. 5 shows a three track magnetic head 33. The deviations with respect to the theoretical center of the magnetic head are indicated in millimeters. The maximum and minimum deviations are shown. The single track magnetic head 11 can be required to be used either for reading magnetic track 1, or magnetic track 2 or magnetic track 3 on the magnetic card 4. Thus, the single track magnetic head 11 has to be appropriately adjusted or positioned. The two track magnetic head can either be used for reading track 1 and track 2, or for reading track 2 and track 3. The three track magnetic head 33 is used for reading magnetic tracks 1, 2 and 3.

When manufacturing a magnetic card reader, of the type shown in FIG. 6 through 9, a problem occurs inasmuch as different types of magnetic card readers have to be supplied by the manufacturer of the card readers. For some applications it is necessary to supply magnetic card readers which are equipped with 1 track magnetic heads, or it is necessary to supply magnetic card readers having 2 track magnetic heads, or, it is necessary to supply magnetic card readers using a three track magnetic head. Moreover, depending on the order received by the manufacturer of the card readers, it can happen that for magnetic card readers with 1 track magnetic heads or 2 track magnetic heads, for instance, the 1 track magnetic head 11 is used for reading track 1 of the magnetic card, or it is used for reading track 2 of the magnetic card. Or, possibly, the 1 track magnetic head 11 is used to read the third track on the magnetic card. Similarly, the requirements might differ for the two track magnetic head 10.

As already pointed out initially, the prior art deals with this problem by providing a certain degree of flexibility due to the possibility that the magnetic head can be arranged in two different positions at the stationary component of the magnetic card reader.

Refering to FIG. 6 through 9 a magnetic card reader 5 of the invention is explained which uses a cardan-type or universal joint type support means 8 for a magnetic head (for instance magnetic head 10). The mounting or support means (support) 8 comprises a support arm 16 and bearing-, guiding-, and biasing means for said support arm 16. The present invention does not only provide for a novel and advantageous cardan-type support means 8, but further allows that the different magnetic heads 10, 11 and 33 can be easily adjusted and mounted in the desired position depending on the type of magnetic card reader to be produced.

Figure 6:
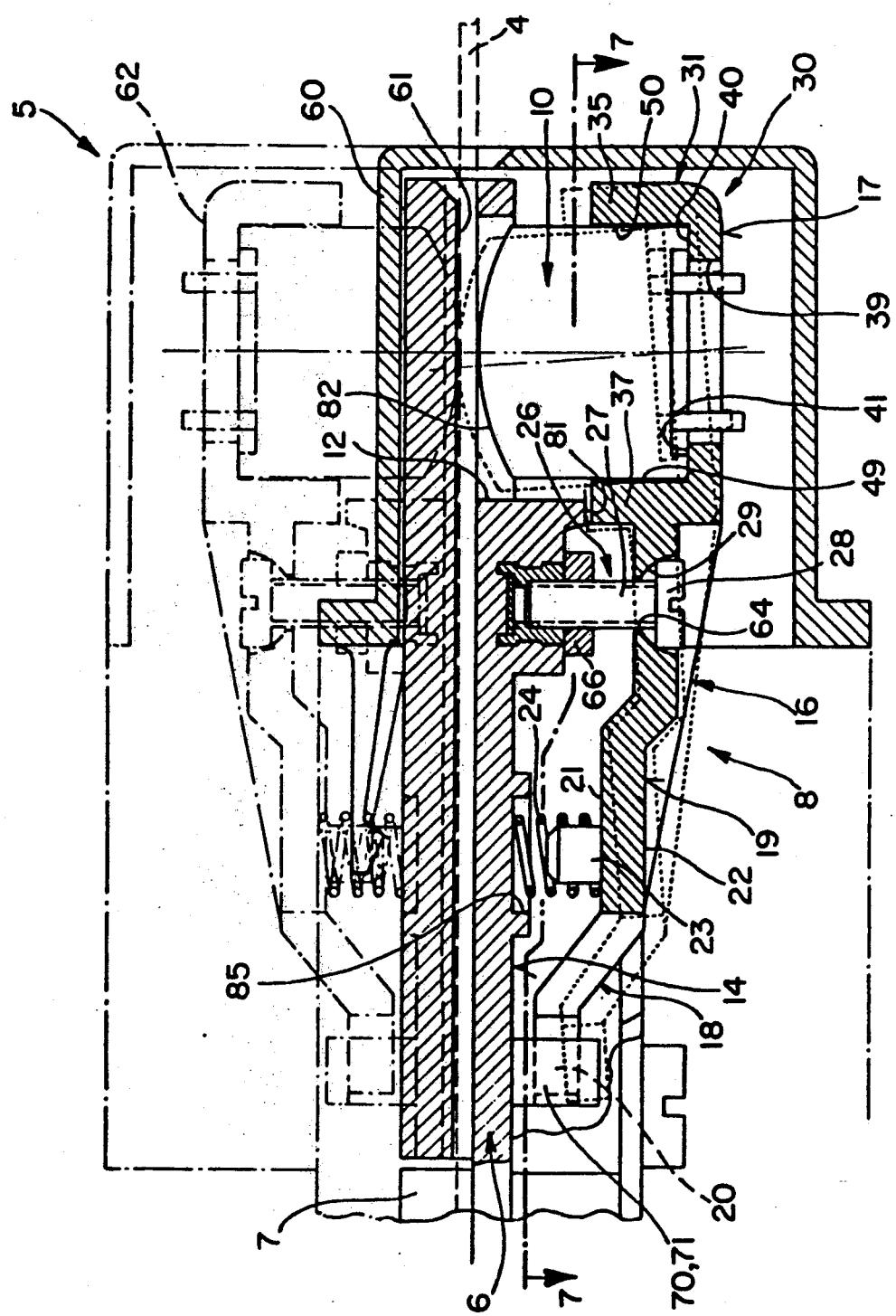
FIG. 6 is a cross-sectional view of a magnetic card reader of the invention along line 6—6 in FIG. 7.
Figure 7:
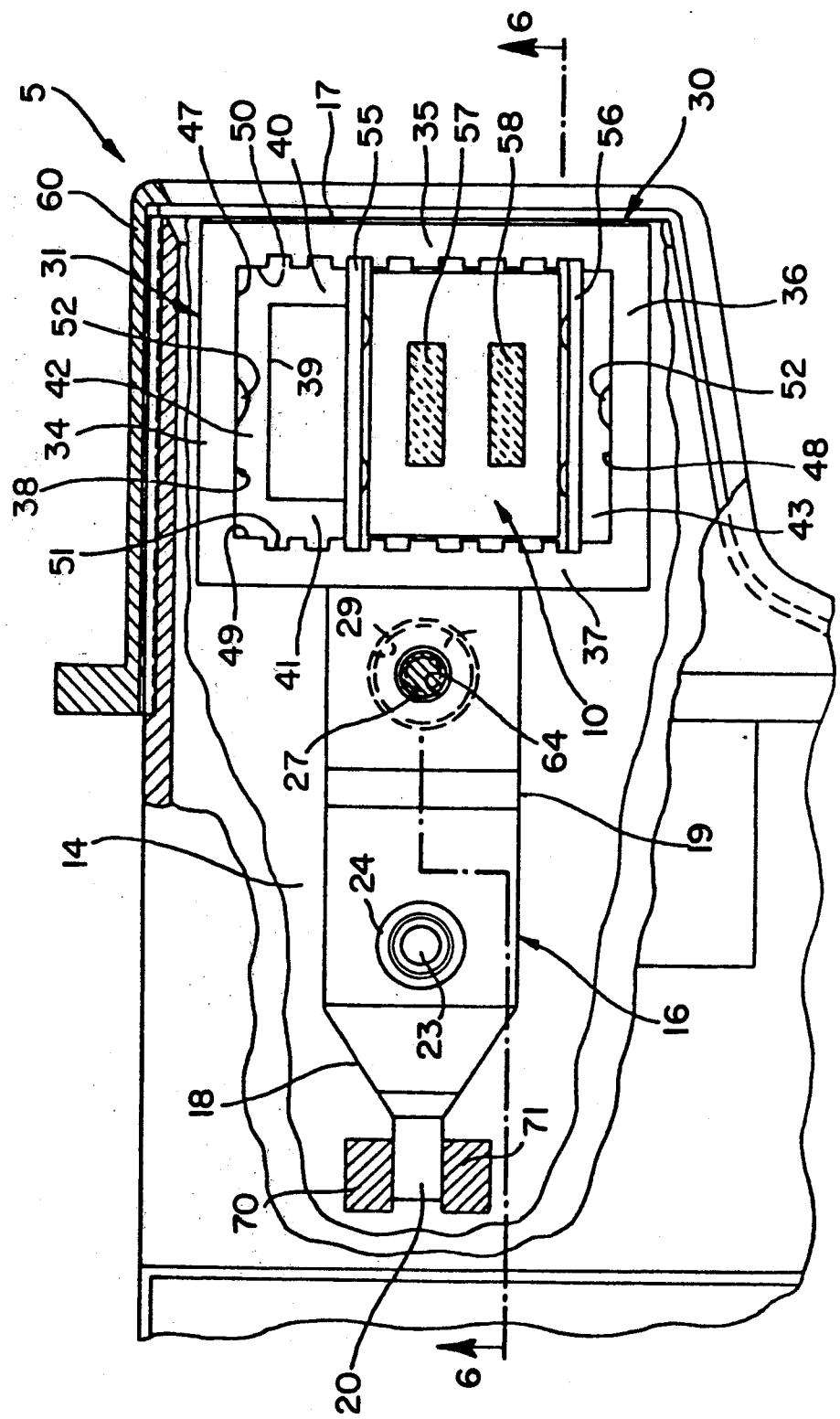
FIG. 7 is a schematic sectional view in substance along line 7—7 in FIG. 6, with only the relevant parts of the magnetic card reader being shown.

FIG. 6 and 7 disclose a magnetic card reader 5 which is mounted at a bottom 6 which in turn is fixedly connected with a frame 7 of a chip card reader. In the case of a chip card reader, the reading apparatus of the invention can be used to read not only the magnetically stored information by means of the magnetic card reader 5, but it is also possible that an adjacently located chip card reader processes the information contained in a chip which is also provided in the magnetic card. A card which contains both magnetically stored information and also a chip is called a hybrid-card. The present invention, however, relates primarily to the design of a magnetic card reader 5, even though the magnetic card reader of the invention can be advantageously used together with a chip card reader.

FIG. 6 discloses that at the bottom surface 14 of the bottom 6 the cardan type support means 8 for the magnetic head is shown. In the shown embodiment the magnetic head (see FIG. 7) is a 2 track magnetic head 10. As will be explained below the cardan-type support means 8 comprises the support arm 16 as well as means 26 for bearing (supporting) said support arm 16, means 20 for guiding the support arm 16 and, eventually, means 24 for biasing said support means 8. Said guiding means 20 are adapted to cooperate with additional guiding means 70, 71 located on a stationary component.

Figure 9:
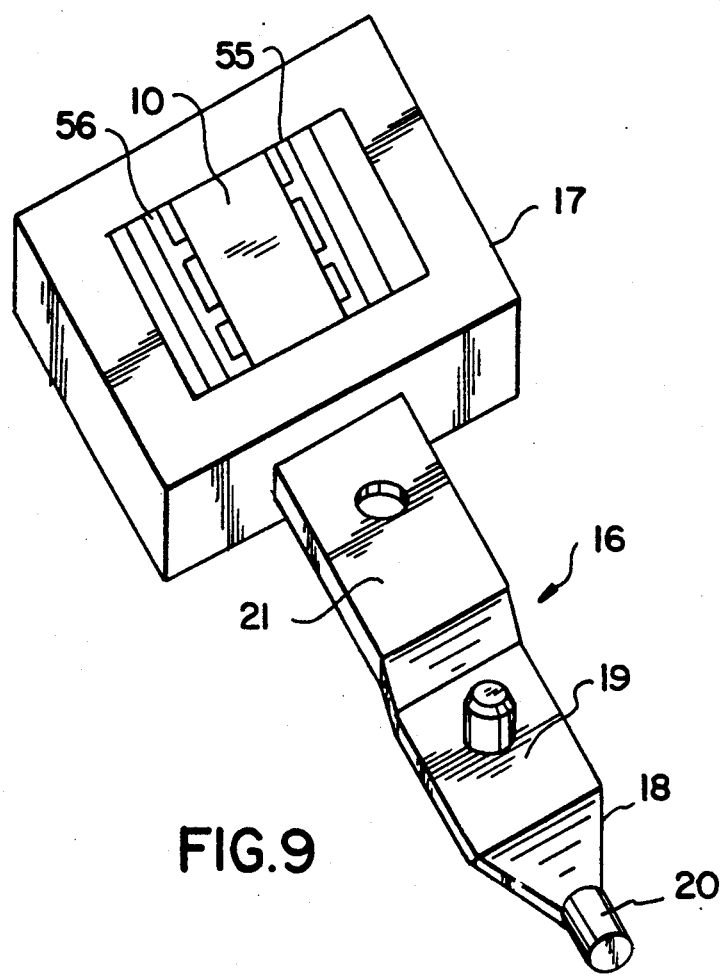
FIG. 9 is a schematic view of a support arm which is shown in detail in FIG. 6 and 7.

The support arm 16 as shown in FIG. 6, 7 and 9 comprises a first or magnetic head end 17 carrying the magnetic head 10. Opposite to the first end is a second or support end (also called bearing end) 18, and in between is a central portion 19. The support arm 16 is made of plastic material and can thus be produced precisely, efficiently and at low cost.

The bearing or mounting end 18 ends in guiding means in the form of a guide portion 20 (see FIG. 9) having a circular cross section. The guide portion 20 is guided by means of the above mentioned additional guide means, which are preferably in the form of two guide members 70, 71, so as to provide guidance for the guide portion 20 during a movement in a direction parallel to guide members 70 and 71. A sideways movement of the guide portion 20 is not possible, however a certain amount of rotary motion of the guide portion 20 and of the support arm 18 is possible, thanks to the round design of the guide portion 20. The guide means 70, 71 are fixedly mounted to the bottom 6 and are preferably integrally formed of plastic material together with the bottom 6.

The support arm 16 is provided with an upper surface 21 and a bottom surface 22. The central portion 19 of the guide portion 20 is generally step shaped as is shown in FIG. 6. At the upper side 21 a vertically upwardly extending guide pin 23 is provided, preferably integrally together with the support arm 16. The guide pin 23 is provided with biasing means 24 preferably in the form of a cylindrical spring 24 which is in abutment with the upper surface 21 and with the bottom surface 14 of the bottom 6. A recess 85 formed by an annular projection makes a sideways movement of the spring 24 impossible. The spring 24 supplies the force which presses the magnetic head 10 onto the card 4.

Support or bearing means 26 are provided for the support arm 16. In the shown embodiment said support or bearing means 26 are formed by a standard screw 27 having a cylindrical screw head 28. The cylindrical screw head 28 is in abutment with a ball shaped or spherical bearing surface 29 which is formed in the support arm 16. The bearing surface 29 ends in a bore 64 through which the screw 27 passes. The screw 27 can be adjustably screwed into the bottom surface 14 of the bottom 6. In the adjusted position the screw 27 is secured by a lock-nut 6. The support or bearing means 26 provide for a universal pivotal movement of the support arm 16. However, this pivotal movement is limited by the mentioned guide means 70, 71.

Figure 8:
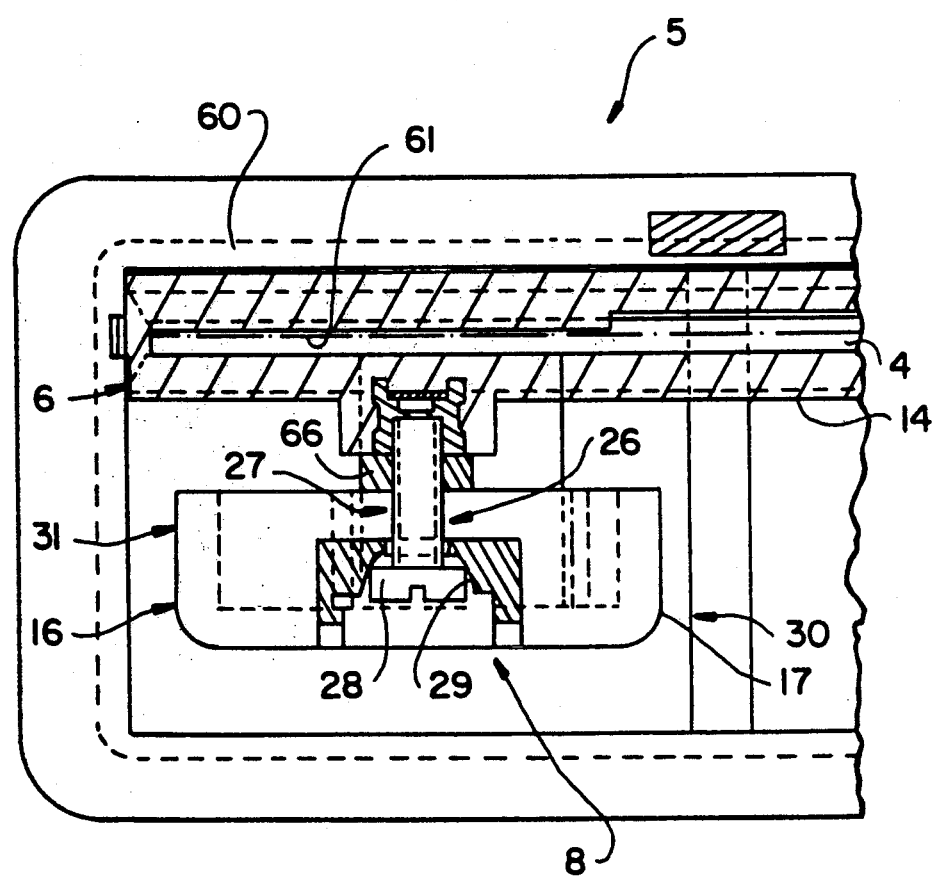
FIG. 8 is a sectional view of the bearing or mounting means of FIG. 6 with the sectional plane extending substantially perpendicular to the paper plane of FIG. 6.

FIG. 8 is a sectional view of the just described support or bearing means 26.

It should be noted that instead of the bearing means 26 as shown, custom made screw can replace the standard screw 27. Said custom made screw would have a spherical bottom surface, which would then be adapted to cooperate with a surface of the support arm 16 which would not need to be of special design.

Figure 11:
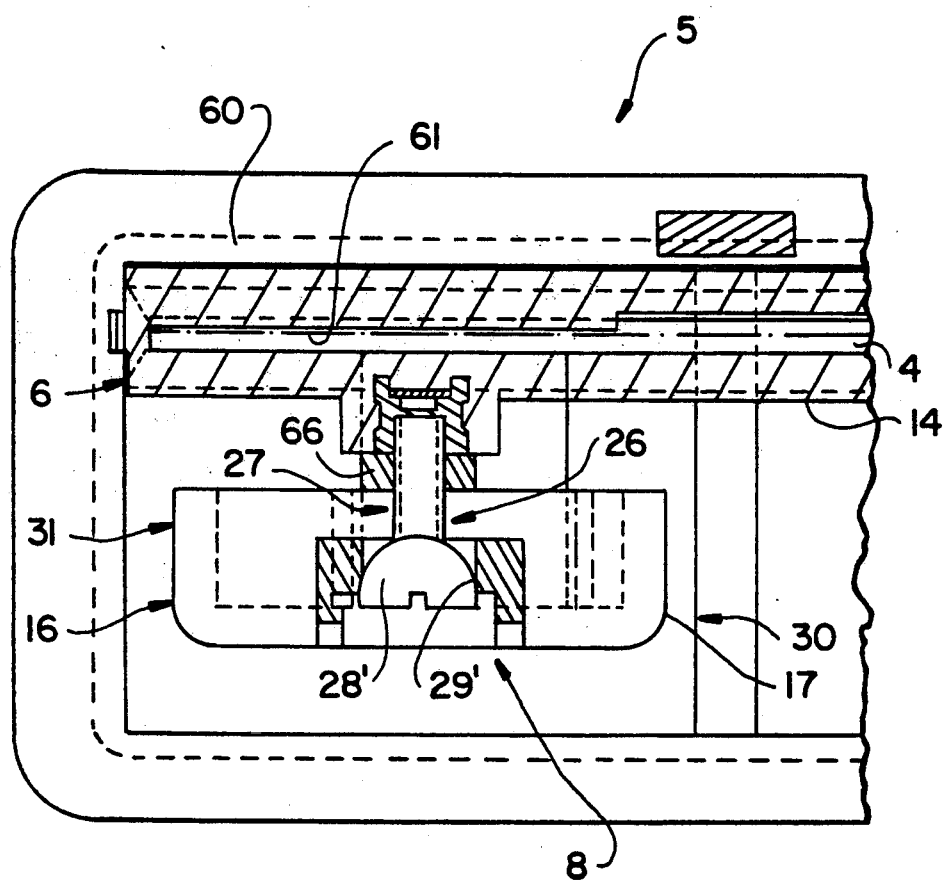
FIG. 11 is a sectional view similar to that of FIG. 6 showing an alternative mounting means.

This variation is shown in FIG. 11 in which cylindrical screw head 28 and spherical surface 29 are replaced respectively by spherical screw head 28' and cylindrical surface 29'.

The support arm 16 forms at its magnetic head end 17 magnetic head adjustment means 30 which allow the adjustment of a magnetic head for different tracks of a magnetic card, without having to change the position of the support arm 16 at the bottom 6 of the magnetic card reader 5. Due to the design of the magnetic head end 17 of the support arm 16 in accordance with the invention, the respective magnetic head (for instance magnetic head 10) can be located in its different positions transversely with respect to the longitudinal axis of the support arm so as to enable the reading of different tracks on a magnetic card 4.

The adjustment means 30 for the magnetic head are preferably provided in the form of an adjustment frame 31. The adjustment frame 31 is integrally formed together with the support arm 16 of a plastic material. The adjustment frame 31 comprises frame legs 34, 35, 36 and 37 defining a large (or upper) opening 38 and a smaller (or lower) opening 39 such that guide surfaces 40 and 41 as well as abutment surfaces 42 and 43 are defined. Opening 39 is a through opening. Further, narrow side walls 47 and 48 as well as wide sidewalls 49 and 50 are formed. In said wide sidewalls a plurality of mounting grooves 51 are formed which are respectively aligned with each other. In said mounting grooves 51 little plates 55 and 56 can be inserted for mounting or holding purposes. Moreover, the narrow sidewalls 47 and 48 form projections 52. The mounting plates 55 and 56 preferably consist of a resilient plastic material. The plates 55, 56 are provided with noses for abutment against the sidewalls of the magnetic head 10. Preferably, the holding plates 55 and 56 are biased against the sidewalls of the magnetic head 10. If the magnetic head 10 is in one of its outer positions abutting against the wall 47 or wall 48 then only one holding plate 55 or 56 is required.

If large numbers of the adjustment frame 31 are manufactured, the holding or positioning plates 55 and 56 can be formed integrally with the frame 31. In such a situation no adjustment of the magnetic head is provided.

It is noted that in the embodiment shown the magnetic head 2 is of the 2 track design, and therefore two magnets 57 and 58 are schematically shown.

Figure 2:
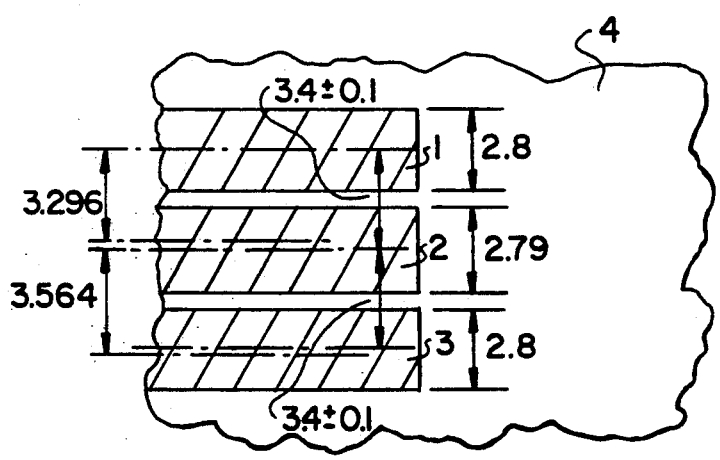
FIG. 2 is a detail of the magnetic card of FIG. 1 on an enlarged scale.

In accordance with FIG. 7 the magnetic head 10 is located in a position adapted to read tracks 2 and 3 as shown in FIG. 2. The holding plates 55, 56 hold the magnetic head 10 in the shown position due to spring pressure. Preferably, the magnetic head 10 can also be bonded by an adhesive to the adjustment frame 31.

When manufacturing a magnetic card reader 5 or the support arm 16 for said reader 5, it is easily possible to locate the magnetic head (for instance the head 10) at a different selected position. For this purpose, the magnetic head 10 is moved within the adjustment frame 31 into the desired position, prior to inserting the holding plates 55 and 56. For the embodiment shown, the magnetic head 10 would have to be moved into a position where the tracks 1 and 2 can be read, and, in that position the magnetic head 10 is fixedly mounted by means of the holding plates 55 and 56. Likewise, the positioning of a single track magnetic head 11 is possible at one of three different positions, without requiring to displace the support arm 16 sideways at the bottom surface 14, as is required for the prior art.

In accordance with another embodiment no holding plates 55 and 56 are provided, and, instead, the magnetic head 10 is sideways guided by the wide sidewalls 49 and 50 and the guide surfaces 40 and 41. As soon as the required position is reached by the magnetic head, it is bonded to the adjustment frame 31 by means of an adhesive. It should be noted that a magnetic head 10 which is fixedly mounted within the adjustment frame does not have to be moved after having been delivered to a customer in a magnetic card reader.

As shown in FIG. 6 a slot 61 is provided through which a magnetic card 4 can be inserted. During insertion, the magnetic card 4 moves the magnetic head 10 located in the dashed position into a position shown with solid lines. During the movement of the card 4 the information stored within the magnetic tracks can be processed. FIG. 6 also discloses a front cover 60 which surrounds the magnetic head and its support means.

Figure 10:
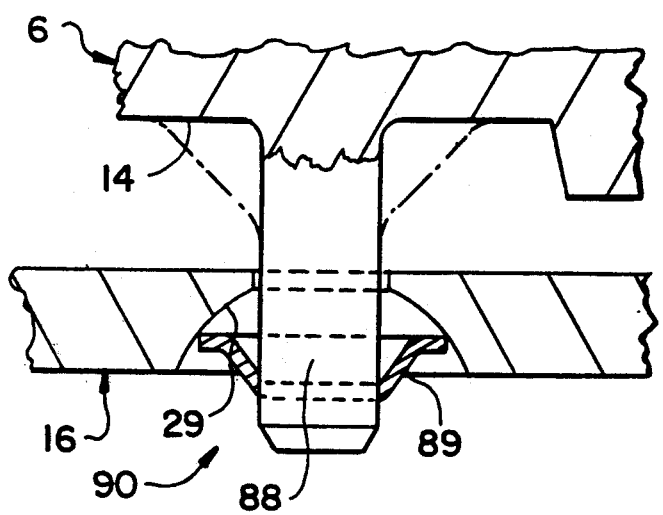
FIG. 10 is a partial sectional view of alternative bearing means.

FIG. 10 is an alternative embodiment to the support or bearing means 26 of FIG. 6. The bearing means in FIG. 10 are referred to by reference numeral 90 and comprise a pin 88 made of plastic material and integrally formed preferably during an injection molding process together with the bottom 6. A securing disc 89 is—as shown—in engagement with said pin 88 and is further in abutment with the bearing surface 29. Instead of the integrally formed plastic pin 88 it is possible to use a metal pin which is embedded into the plastic material of the bottom 6.

As mentioned above it is preferred to provide the magnetic head adjustment means 30 with a number code or a character code. This code is preferably molded into said guide means at the time the adjustment means 30 is formed, for instance by injection molding. Alternatively, said codes can be printed or glued onto said guide means. The code can also be a color code.

Abutment means can be provided for the magnetic head 10 having the rounded surface 82. In accordance with FIG. 6 said abutment means are formed by a surface 81 which cooperates with the magnetic head guide means 30. The surface 81 is formed on a projection of the bottom surface.

As is shown in dotted lines, the cardan-type support means may be provided at the bottom side as well as the upper side of the bottom 6.

I claim:

1. A reader for cards carrying magnetic stripes containing information, said reader comprising:
   a stationary frame including means for receiving said cards;
   support means mounted on said stationary frame for supporting a magnetic head at different selectable locations, said support means comprising means including a support arm and a positioning frame for receiving said magnetic head at said different selectable locations, said support means being mounted on said stationary frame for cardanic movement by means of a cardanic bearing on said support means, said bearing engaging a screw mounted on said stationary frame to permit cardanic movement of said support means in respect to said stationary frame, and said support means further comprising a guide portion cooperating with guide means provided on said stationary frame for inhibiting sideways movement of the support arm.

2. A support as claimed in claim 1 further comprising means for permitting the magnetic head to be adjustably moved within said positioning frame in a direction perpendicular to a longitudinal axis of said support arm.

3. A support as claimed in claim 1, wherein the support arm is of single piece design.

4. A support as claimed in claim 3, wherein the support arm is made of plastic material.

5. A support as claimed in claim 1, further comprising biasing means in the form of a cylindrical spring for biasing said support arm and consequently said magnetic head towards one of said magnetic tracks, and spring being in abutment with a bottom surface of the stationary frame and with an upper surface, at a center portion, of the support arm.

6. A support as claimed in claim 5, wherein said support arm is of generally step-shaped design.

7. A support as claimed in claim 1, wherein the positioning frame comprises guides including sidewalls of said positioning frame, said sidewalls forming means for guiding the magnetic head in a direction transverse to a longitudinal axis of said support arm.

8. A support as claimed in claim 7, wherein the support arm together with the guide portion and the positioning frame are formed of plastic material as a single piece.

9. A support as claimed in claim 1, wherein said positioning comprises positioning means in the forms of mounting grooves for receiving magnetic head holding plates.

10. A support as claimed in claim 9, wherein said positioning frame comprises means including guide surfaces of said positioning frame for positioning said magnetic head perpendicularly with respect to a longitudinal axis of said support arm.

11. A support as claimed in claim 1, wherein said magnetic head positioning frame is injection molded and wherein a code in the form of numbers, letters or characters is molded into said magnetic head positioning frame during injection molding thereof.

12. A support as claimed in claim 1, further comprising abutment means for limiting movement of the magnetic head towards the magnetic card.

13. A support as claimed in claim 12, wherein said abutment means comprises a surface formed in said stationary frame.

14. A support as claimed in claim 1, wherein the bearing comprises a pin formed integrally with the stationary component.

15. A support as claimed in claim 1, further comprising a second support arm adapted to support a second magnetic head and which is cardanically mounted on a surface of a stationary component opposite a surface on which the first support arm is mounted.

16. A cardan type support for a magnetic head arranged to read information stored magnetically in one or more magnetic tracks on a magnetic card, support being adapted to be mounted on a stationary component of a magnetic card comprising:
   support arm means for supporting a magnetic head, said support arm means comprising a support arm having a first end, and opposite thereto, a second end;
   means for cardanically mounting the support arm on a stationary component, including:
   bearing means for permitting pivotal movement of the support arm;
   biasing means separate and spaced from said bearing means for biasing said support arm and consequently said magnetic head towards one of said magnetic tracks;
   guide means for guiding the support arm and including a guide portion on the second end of said support arm, said guide portion being adapted to move between guide members located on the stationary component; and further comprising:
   a magnetic head positioning frame located on said first end of said support arm for positioning of the magnetic head to a desired track position selected from a plurality of track positions; and
   means for fixedly mounting said magnetic head to said magnetic head positioning frame after said magnetic head has been adjusted to said desired track position, wherein said bearing means comprises a crew having a screw head, said screw head being supported by a spherical bearing surface provided in the support arm.

17. A support as claimed in claim 16, wherein the screw is adapted to be fixed at a predetermined position with respect to the stationary component by means of a securing nut.

18. A support as claimed in claim 16, wherein the screw is fixed at a predetermined position with respect to the stationary component by gluing.

19. A cardan type support for a magnetic head arranged to read information stored magnetically in one or more magnetic tracks on a magnetic card, comprising:
- a support arm means for supporting a magnetic head, said support arm means comprising a support arm having a first end, and opposite thereto, a second end;
- means for cardanically mounting the support arm on a stationary component including:
- bearing means for permitting pivotal movement of the support arms;
- biasing means separate and spaced from said bearing means for biasing said support arm and consequently said magnetic head towards one of said magnetic tracks;
- guide means for guiding the support arm and including a guide portion on the second end of said support arm, said guide portion being adapted to move between guide members located on the stationary component; and further comprising:
- a magnetic head positioning frame located on said first end of said support arm for positioning of the magnetic head to a desired track position selected from a plurality of track positions; and
- means for fixedly mounting said magnetic head to said magnetic head positioning frame after said magnetic head has been adjusted to said desired track position, wherein the bearing means comprises a screw, a head of which has a spherical bearing surface adapted to cooperate with a recess in the support arm.

20. A cardan type support for a magnetic head arranged to read information stored magnetically in one or more magnetic tracks on a magnetic card, comprising:
- support arm means for supporting a magnetic head, said support arm means comprising a support arm having a first end, and opposite thereto, a second end;
- means for cardanically mounting the support arm on a stationary component, including:
- bearing means for permitting pivotal movement of the support arm;
- biasing means separate and spaced from said bearing means for biasing said support arm and consequently said magnetic head towards one of said magnetic tracks;
- guide means for guiding the support arm and including a guide portion on the second end of said support arm, said guide portion being adapted to move between guide members located on the stationary component; and further comprising:
- a magnetic head positioning frame located on said first end of said support arm for positioning of the magnetic head to a desired track position selected from a plurality of track positions; and
- means for fixedly mounting said magnetic head to said magnetic head positioning frame after said magnetic head has been adjusted to said desired track position, wherein the bearing means comprises a metal pin formed integrally with the stationary component and a securing disc supported by a spherical supporting surface in the support arm.

* * * * *